United States Patent [19]
Partridge

[11] Patent Number: 6,058,219
[45] Date of Patent: May 2, 2000

[54] METHOD OF SKELETONIZING A BINARY IMAGE USING COMPRESSED RUN LENGTH DATA

[75] Inventor: Christopher Scott Partridge, Henniker, N.H.

[73] Assignee: Autodesk, Inc., San Rafael, Calif.

[21] Appl. No.: 08/949,081

[22] Filed: Oct. 10, 1997

[51] Int. Cl.[7] ............................... G06K 9/44; G06T 5/30; H04N 1/419

[52] U.S. Cl. ......................... 382/259; 382/235; 382/245; 358/261.1

[58] Field of Search ..................................... 382/259, 258, 382/245, 176, 232, 256, 257, 235, 268; 358/261.1

[56] References Cited

U.S. PATENT DOCUMENTS

| | | |
|---|---|---|
| 3,975,709 | 8/1976 | Beun et al. . |
| 4,491,960 | 1/1985 | Brown . |
| 4,539,704 | 9/1985 | Pastor ...................................... 382/258 |
| 4,792,981 | 12/1988 | Cahill, III et al. ..................... 382/235 |
| 5,050,229 | 9/1991 | Barski et al. ........................... 382/259 |
| 5,224,179 | 6/1993 | Denker et al. .......................... 382/259 |
| 5,335,290 | 8/1994 | Cullen et al. . |

OTHER PUBLICATIONS

T.Y. Zhang and C.Y. Suen, "A Fast Parallel Algorithm for Thinning Digital Patterns," *Communications of the ACM*, Mar. 1984, vol. 27, No. 3, pp. 236–239.

Theo Pavlidis, "A Thinning Algorithm for Discrete Binary Images," *Computer Graphics and Image Processing*, vol. 13, (1980), pp. 142–157.

Carlo Arcelli, "A Condition for Digital Points Removal," *Signal Processing 1*, North–Holland Publishing Company, vol. 1, No. 4, (Oct. 1979) pp. 283–285.

*Primary Examiner*—Scott Rogers
*Attorney, Agent, or Firm*—Gates & Cooper

[57] ABSTRACT

The present invention relates to a process for producing a skeleton from a binary image by using the compressed run data of the image instead of using natural expanded binary format of the image. A run length compressed image is a binary image (black/white) that is compressed by taking stripes of pixels of the same value and grouping them together into a single "run" of pixels. This compression technique saves significant amounts of memory on most binary images. It is an object of this present invention to enable the image to be skeletonized in its run length compressed format. This reduces the amount of data that needs to be stored in memory. Further, since the image is in "runs" and not pixels, the pixels that are not affected are not evaluated. By increasing available memory while reducing the amount of pixels to be evaluated, the speed for the process is increased on the order of several magnitudes.

36 Claims, 4 Drawing Sheets

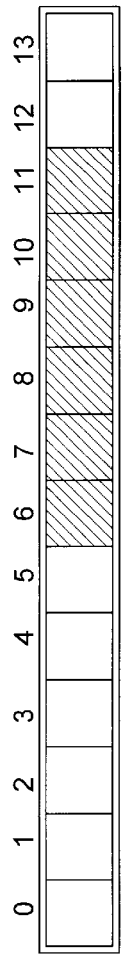
FIG. 3    Top Row    —    0:6,6,2
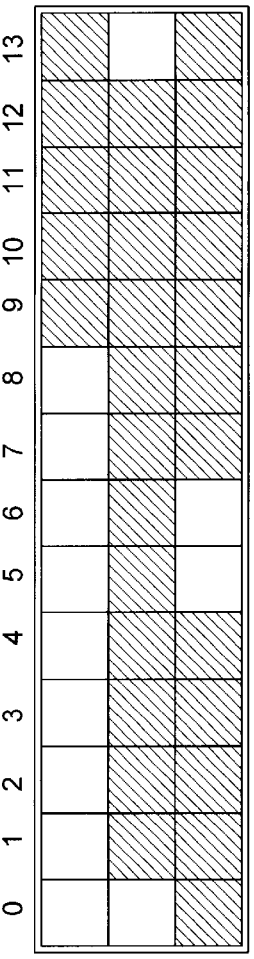
FIG. 4    Top Row    —    0:4,4,5
Process Row -    1:1,12,1
Bottom Row -    2:0,5,2,7
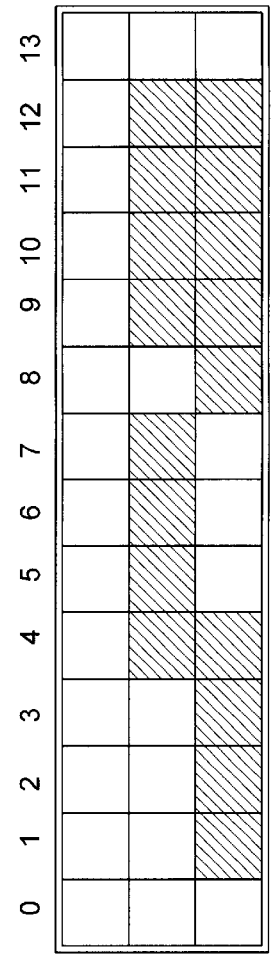
FIG. 5    Top Row    —    0: 14
Process Row -    1: 4,4,1,4,1
Bottom Row -    2: 1,4,3,5,1
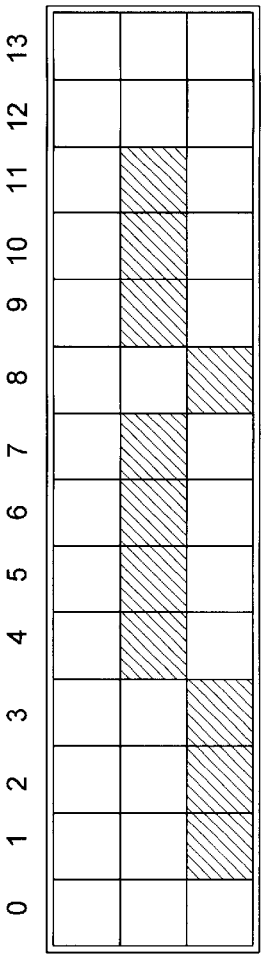
FIG. 6    Top Row    —    0: 14
Process Row -    1: 4,4,1,3,2
Bottom Row -    2: 1,3,4,1,5

Top Row      -    0: 14
Process Row -    1: 4,4,1,3,2
Bottom Row -    2: 1,3,4,1,5

Top Row      -    0: 14
Process Row -    1: 4,4,1,3,2
Bottom Row -    2: 1,3,4,1,5

6,058,219

METHOD OF SKELETONIZING A BINARY IMAGE USING COMPRESSED RUN LENGTH DATA

BACKGROUND OF THE INVENTION

1. Field of the Invention

The present invention relates to a process for manipulating images using compressed run length data of the image.

2. Description of the Related Art

An image skeleton represents the basic structure of an image and is created by decomposing the widths of raster objects in the image to uniform single pixel widths. This simplifies the task of certain recognition systems from character recognition to geometrical recognition.

The current state of the art provides a process for skeletonization of an image by stripping one layer of pixels after another. The process continues until the set of pixels left form a one pixel wide line and is defined as separating two "off" areas. This process is known as raster "thinning" or "erosion."

The problems associated with the current skeletonization processes include their relatively slow speed and extensive memory utilization requirements. In order to skeletonize the image using the current techniques, two copies of the image must be maintained in memory. For large images, this could mean storing an extraordinary, amount of data. The larger the data file, the greater the access time. Therefore, the process of data retrieval and storage increases in time with the increased amount of data stored.

Also, every pixel in the image is evaluated regardless of whether the pixel will be removed or ignored. This requires a substantial increase in the number of points to be evaluated and increases the amount of time required to complete the process.

The prior art discloses a number of devices utilizing appropriated methods and apparatus for skeletonization of images used in pattern recognition. For example, U.S. Pat. No. 3,975,709 to Beun et al. and U.S. Pat. No. 5,224,179 to Denker et al. disclose methods of image thinning or skeletonization utilizing at least 3×3 grid pixel by pixel analysis to thin a character of interest.

Another reference, U.S. Pat. No. 5,335,290 to Cullen et al., teaches a character recognition system by extracting run lengths for each scanline from the bit mapped representation of the document image and classifying the data as image, text or as a horizontal or vertical line. However, there is no teaching of the process of skeletonization by run length comparison which is needed to increase speed of the pattern recognition.

Still another reference, U.S. Pat. No. 4,491,960 to Brown, describes a pattern comparison system wherein a raster scan of a hand print produces a topography to be compared to given parameters for identification.

Yet another reference, Zhang et al., "A Fast Parallel Algorithm for Thinning Digital Patterns", discloses skeletonization via pixel by pixel comparison and removal of subsequent outer pixels for character thinning.

However, the prior art fails to address the problem of size of data files and speed of skeletonization and does not disclose, teach or even suggest the embodiments of the claimed invention.

SUMMARY OF THE INVENTION

To address the requirements described above, the present invention discloses a method, apparatus, and article of manufacture for producing a skeleton from a binary image by using the compressed run data of the image instead of using natural expanded binary format of the image.

A run length compressed image is a binary image, often black and white, that is compressed by taking stripes of pixels of the same value and grouping them together into a single "run" of pixels. The process analyzes three rows at a time and compares the runs in the encompassing external rows with the runs in the internal row.

Features of the invention are the process of erosion or skeletonization of the image in its length compressed format, which reduces the amount of data that needs to be stored in memory. Since the image is represented and analyzed in terms of "runs" and not pixels, the pixels that are not affected are not evaluated. By increasing available memory while reducing the number of pixels to be evaluated, the speed for the process is increased on the order of several magnitudes.

The disclosed computer-based method of reducing an image to its skeleton utilizes a two pass analysis process wherein each row of an image is analyzed with respect to adjacent rows. More specifically, the method comprises storing an image in a temporary buffer; reading the image from the temporary buffer and storing the image as a source image in a source image buffer as a series of rows, each row comprising one or more runs of on or off pixels; processing the source image row by row with respect to adjacent top and bottom rows using a two pass analysis process comprising a top-left analysis pass and a bottom-right analysis pass wherein the top-left analysis pass analyzes each run in each row of the source image and removes all on pixels adjacent to top and left off runs and wherein the bottom right analysis pass analyzes each run in each row of the source image and removes all on pixels adjacent to bottom and right off runs; building, after each run is processed in each analysis pass, a destination image in a destination buffer by storing non-removed pixels in the destination image; comparing, after each two pass analysis process, the destination image with the source image; replacing the source image with the destination image if the images differ; and repeating the two pass analysis process until the destination image is identical to the source image.

BRIEF DESCRIPTION OF THE DRAWINGS

Referring now to the drawings in which like reference numbers represent corresponding parts throughout:

FIG. 3 illustrates a sample row comprised of various run lengths;

FIG. 4 illustrates the original image to be processed using the disclosed skeletonization method:

FIG. 5 illustrates the image of FIG. 4 after a top-left analysis pass is performed;

FIG. 6 illustrates a further skeletonization of the original image after a bottom-right analysis pass is performed;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
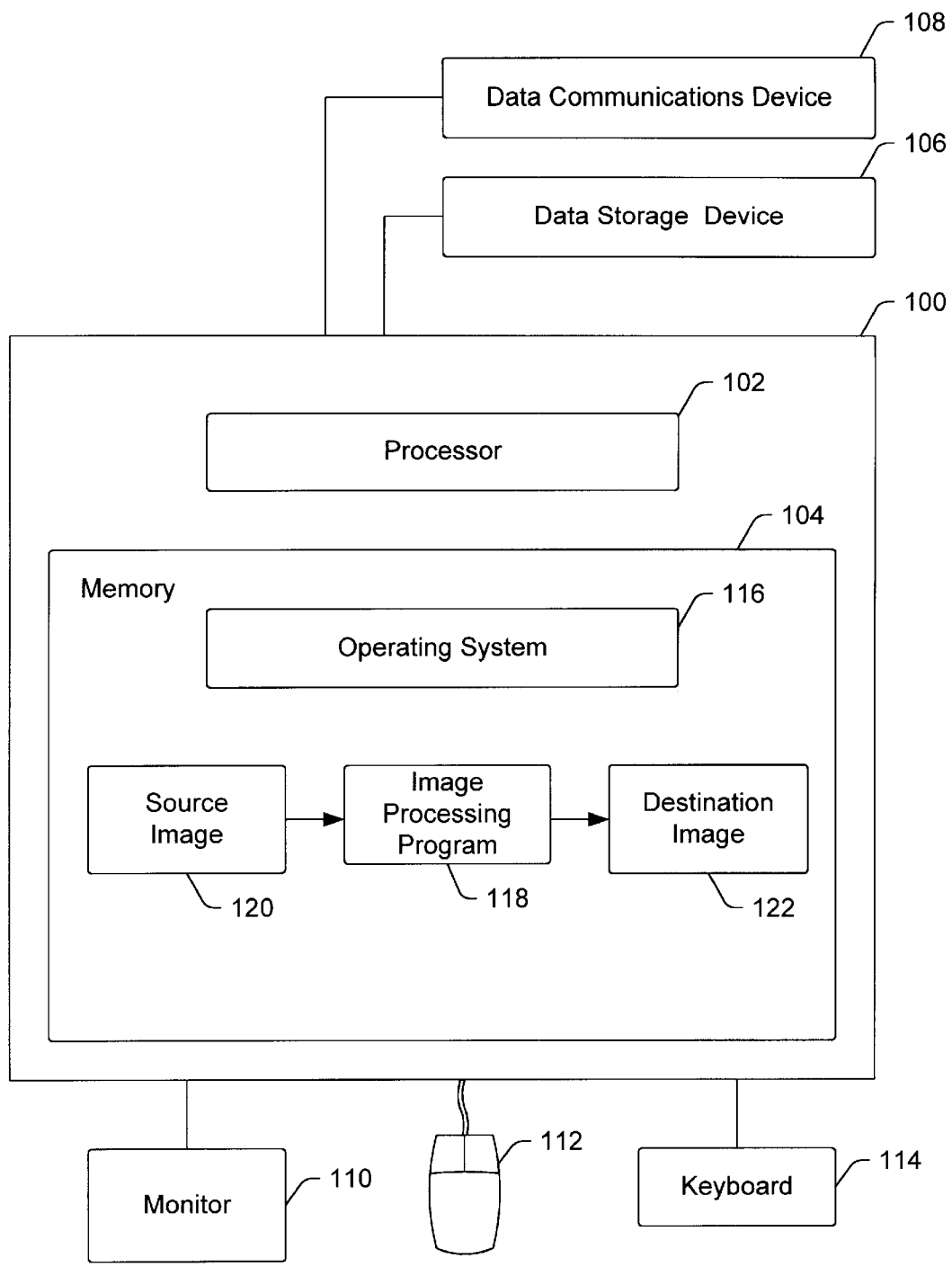
FIG. 1 illustrates an exemplary hardware environment for the present invention.

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The present invention is usually implemented by one or more computer programs 118 that skeletonize a binary source image 120 to create a destination image 122. However, it should be understood that, in the alternative, the principles of the invention may also apply to specific utilities or functions within the operating system 116 itself. In general, the functions performed in the present invention, whether implemented as part of an operating system 116 or a specific computer program 118, will be referred to herein as "computer programs".

Generally, the computer program 118 which implements the preferred embodiment of the invention is embodied in or readable from a computer-readable device, medium or carrier, e.g., one or more of the fixed and/or removable data storage data devices 106 and/or a remote device attached to the computer 100 via the data communications devices 108. Under control of operating system 116, the computer program 118 may be loaded from the data storage devices 106 or data communications devices 108 into the memory 104 of computer 100. The computer program 118 comprises instructions which, when read and executed by computer 100, cause the computer 100 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Overview

An image or character of interest that is to undergo the process of skeletonization is scanned and stored in temporary memory in a first buffer where the pattern of the character will be read. The image pattern is then read and is stored as a plurality of discernible rows of "on" and "off" pixels which define the image. Furthermore, a particular row of the image can be characterized into smaller subsets of runs of "on" and "off" pixels or "run lengths." A run length representation of a particular image can be expressed in a row index table. The first number for each row, which is set off from the remaining numbers, is the row number. The top row of an image would be expressed in the index table as row "0". The second row would begin with "1" and so on for each additional row. Following the ":" is a series of numbers, which are set off from each other by commas. The first number in the set always indicates the number of "off" pixels in the first run length making up the row. If the first pixel in the row is "on" then the length of the first run would be zero.

FIG. 3 shows a single row of an image that is 13 pixels wide (pixels "0" through "12"). The index table representation for this row would be "0:6,6,2". The first "0" defines the row while the numbers after the colon define the run lengths of the "on" and "off" runs that make up the row. Since the first number following the colon is the number of "off" pixels in the first run, the index table representation of FIG. 3 can be read to mean that the first run length in the row comprises six "off" pixels. The remaining numbers in the index table representation indicate a run of six "on" pixels, which is in run, followed by a final run comprising two "off" pixels.

In the method of skeletonization disclosed herein, the run lengths of adjacent rows of an image are compared in order to resolve the image into its skeleton. By analyzing "runs" or groups of pixels instead of single pixels, the disclosed skeletonization method resolves an image much faster than prior art methods.

The skeletonization method will be described with respect to FIG. 4, which shows an image that comprises three (3) rows each containing thirteen (13) pixels. The first row can be described by the index table representation "0:9,5". The second and third rows can be described by the index table representations "1:1,12,1" and "2:0,5,2,7", respectively.

General Logic

Figure 2:
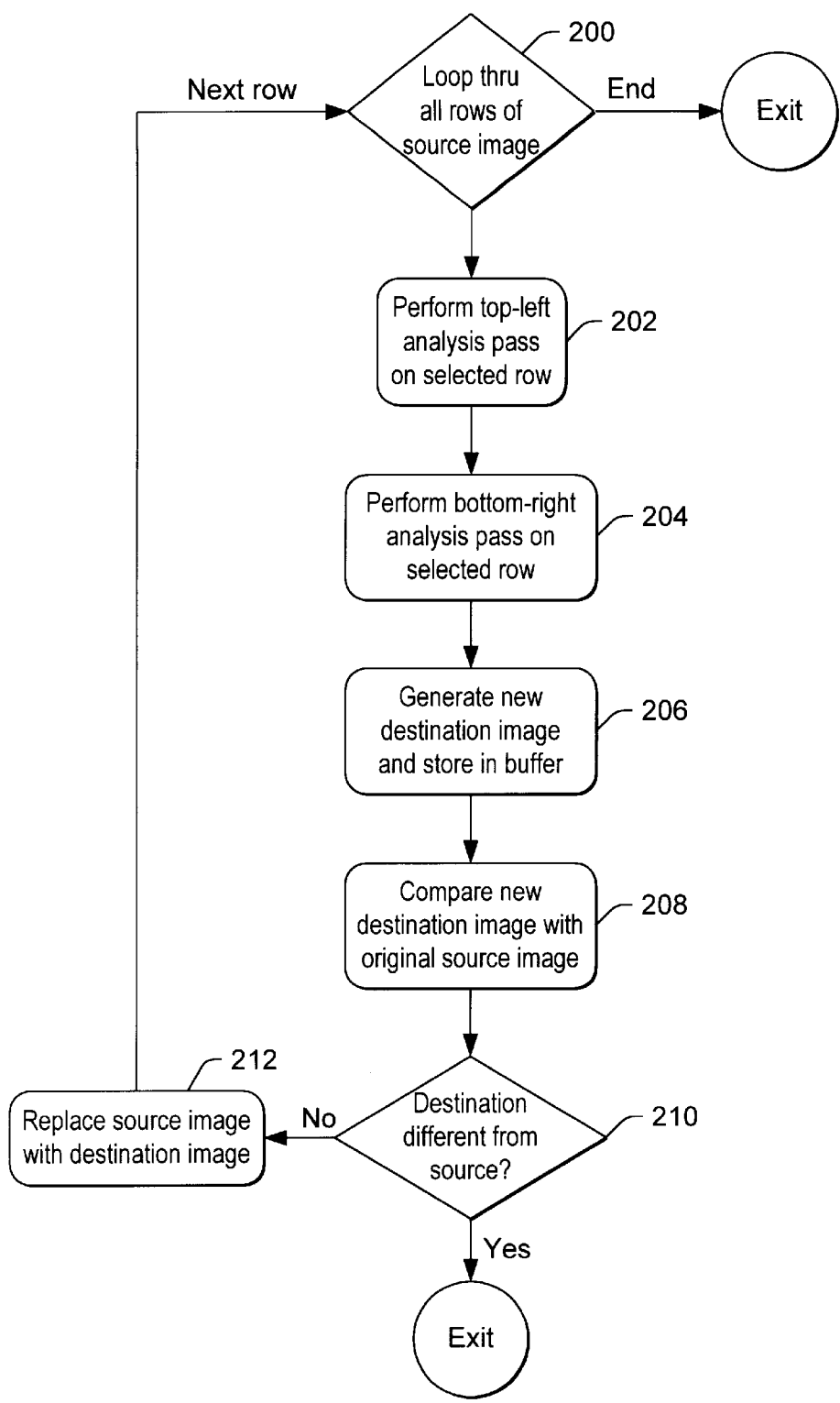
FIG. 2 is a flowchart that illustrates the general logic of the present invention.

FIG. 2 is a flowchart that illustrates the general logic of the present invention. The general logic comprises two analysis passes of the image, in which each row of a source image is sequentially analyzed with respect to the rows above and below the row being analyzed. The rows in the analysis will be referred to hereinafter as the top, process and bottom rows, wherein the process row is the row being analyzed.

Block 200 represents the image processing program 118 looping through and selecting all rows of the source image from a source buffer.

Block 202 represents the image processing program 118 performing the first analysis pass, which is referred to as the "top-left" analysis pass. The goal of the "topleft" analysis pass is to remove all the "on" pixels that are adjacent to "off" pixels located above and to the left of each pixel of the selected row.

Block 204 represents the image processing program 118 performing the second analysis pass, which is referred to as the "bottom-right" analysis pass. The goal of the "bottom-right" analysis pass is to remove all the "on" pixels that are adjacent to "off" pixels located below and to the right of each "off" pixel of the selected row.

Of course, those skilled in the art will recognize that the "top-left" and "bottom-right" analyses passes described above could be reversed in order and still yield an identical skeleton.

Block 206 represents the image processing program 118 generating and storing a new destination image in a destination buffer.

Following the completion of each two-pass analysis, Block 208 represents the image processing program 118 comparing the new destination image stored in the destination buffer with the source image.

Block 210 is a decision block that determines whether the destination image is different from the source image. If not, control transfers to Block 212; otherwise, the logic terminates.

Block 212 represents the image processing program 118 storing the destination image in the source buffer, thereby replacing the source image. In other words, the destination image becomes the source image. Control is then transferred to Block 200, so that the two-pass analysis process is performed with respect to the replaced source image.

Detailed Logic

A more detailed description of the general logic of FIG. 3 is provided below. Further, the two-pass skeletonization method is explained in detail with respect to the images depicted in FIGS. 4–8.

I. Top-Left Analysis Pass

A. Preliminary Top-Left Analysis of Row "0"

The first, top-left, analysis pass begins with a preliminary analysis, which analyzes the first row, or row "0" of the image with respect to a "virtual" top row. The virtual top row comprises all "off" pixels and can be represented in index table format, as "0:14". The process row in the preliminary analysis pass, which is the first actual row of the image, would be represented as "0:9,5" in index table format. Finally, the bottom row for the preliminary analysis pass, which is the second actual row of the image, is represented as "1:1,12,1."

1. Analysis of First "On" Run

The analysis pass begins by scanning the process row until the first "on" run length is encountered. If the process row begins with an "off" run, then the initial "off" run is directly copied as the first run in the analyzed process run, which is stored in the secondary buffer. Referring to FIG. 4, since the process row begins with an initial run length comprising 9 "off" pixels, the first pass destination image created in the first pass destination buffer would be "0:9".

The process then considers the first "on" run in the process row. Each "on" run is analyzed using a tripartite process, which performs distinct analyses for the first "on" pixel, the middle group of "on" pixels and the last or end "on" pixel in the run. In the example of FIG. 4, the first "on" run, begins in the 9th column and comprises a first "on" pixel in column 9, a middle group comprised of three "on" pixels located in columns 10, 11 and 12 and a last or end "on" pixel located in column 13.

a. Analysis of First Pixel in Process "On" Run (i) Is First "On" Pixel a Removal Candidate?

The first part of the tripartite "on" run analysis process begins with an analysis of the first "on" pixel. Since we are analyzing the first "on" pixel during a "top-left" analysis pass, the first "on" pixel is always a candidate for removal since it is by definition, adjacent to an "off" pixel to its immediate left. However, in order to determine whether the first "on" pixel can in fact be removed, we must perform corner pixel connectivity and endpoint analyses.

(ii) Corner Connectivity and Endpoint Analyses for First "On" Pixel

The corner connectivity analysis compares the first "on" pixel of the process run with the runs located in the top and bottom rows that contain the column immediately preceding the column of the first "on" pixel of the process row. A corner connective condition is indicated if there is an "on" run in either adjacent row that ends in the column immediately preceding the first "on" pixel of the process row. This indicates that the first "on" pixel in the first "on" run of the process row is part of the skeleton of the image. Therefore, the process pixel is stored into the destination buffer as an "on" run following, the initial "off" run stored therein.

However, even if a first "on" pixel in a process run is not corner connected, it may nonetheless be part of the skeleton of the image if it is an "endpoint" pixel. Thus, if a first "on" pixel fails its corner connectivity test, an endpoint check must be performed in order to determine whether or not the first "on" pixel is, in fact, part of the skeleton of the image. Like the corner connectivity test, the endpoint check analyzes the runs in the top and bottom rows that contain the first "on" pixel of the process run.

If the comparison of the top and bottom adjacent rows indicates that the first "on" pixel of the process run falls intermediate "off" runs in the top and bottom rows that do not end in the same column as the first "on" pixel in the process run, then the first pixel in the process run is part of the skeleton of the image and cannot be deleted.

There is a special case for a process run that is only one pixel long. In this case, the single "on" pixel comprising the process run can only be deleted if the top adjacent run is an "off" run and the adjacent bottom run is an "off" run and is at least two pixels long.

In the example of FIG. 4, the runs of interest for the corner connectivity and endpoint analyses are the runs located in the virtual top row and row "1" containing column 8. In the example there are no "on" runs in either the virtual top row or the bottom row that end in column 8. Therefore, the first "on" pixel of the process run is not corner connected. Furthermore, since the first "on" pixel is not intermediate "off" runs in both the adjacent top and bottom rows, the first "on" pixel is not an endpoint pixel either. Thus, the first "on" pixel of the process run is not part of the skeleton and can be removed. The "0:9" destination image stored in the first pass destination buffer is therefore updated by adding "1" to the initial "off" run stored therein. Thus, the first pass destination image would be replaced with "0:10", in index table format.

If, on the other hand, the analysis determined that the first "on" pixel were in fact either corner connected or an endpoint pixel, then the result would be that the first "on" pixel would remain as part of the skeleton of the image. In that case, the image stored in the first pass destination buffer would be updated by adding an "on" run comprising one pixel after the initial "off" run stored in the first pass destination buffer.

b. Analysis of "Middle Group" of "On" Pixels in Process Run

The next step in the process is the analysis of the "middle" group of pixels in the first "on" run. In the example of FIG. 4, the "middle" pixels are in columns 10, 11 and 12. Like the analysis performed with respect to the first "on" pixel of the process row, the middle pixel analysis comprises a comparison of the run of interest in the process row with runs located in the top and bottom rows. This comparison process begins with a sandwich analysis of the middle group of "on" pixels in the process row.

(i) Sandwich Analysis

A run length is said to be "sandwiched" if it is located intermediate runs in the top and bottom rows that begin at or before the first column of the process run and end at or after the last column of the process run. (In the example, the run of interest is the sub-run of "on" pixels comprising the middle group of "on" pixels in the process row: i.e. columns 10, 11 and 12.)

(ii) Removal Condition for a Sandwich Middle Group of Pixels

If the middle group of pixels is sandwiched, then the pixels are "removal candidates". In the top-left analysis pass, a sandwiched middle group of pixels is removed if it is sandwiched between an "off" top run and an "on" bottom run. If the middle group of pixels is removed, then the destination image, which is stored in the destination buffer, is updated by adding an "off" run equal to the number of pixels removed to the destination image. In any other case, the middle group of pixels is not removed and the destination image is updated by adding the number of "on" pixels remaining to the number of "on" pixels in the preceding "on" run.

In the example of FIG. 4, the middle group of "on" pixels of the process run is sandwiched between an "off" run in the virtual top row and an "on" run in the bottom row. Therefore, the pixels are removal candidates, and since the removal condition is satisfied (i.e., top "off"/bottom "on"), the top run that contains the middle group of pixels is not part of the skeleton and is therefore removed. Thus, the image stored in the first pass destination buffer would be updated by adding a run of 3 "off" pixels to the existing run of 10 "off" pixels. The updated destination image would be expressed in index table format as "0:13."

c. Analysis of End "On" Pixel in Process Run

Finally, the last or "end" pixel of the process run in the process row must be analyzed.

(i) Is End "On" Pixel a Removal Candidate?

The first step in the "end" pixel analysis is tailored to determine if the end pixel is a removal candidate. In a top-left analysis pass, an end pixel is a removal candidate only if the pixel in the top row directly above the end pixel in the process row is an "off" pixel. In the example of FIG. 4, since the pixel located in column 13 of the process row is located directly below an "off" pixel in the virtual top row, it is a removal candidate.

(ii) Corner Connectivity Analysis for End "On" Pixel

If an end pixel is a removal candidate, then a corner connectivity check must be performed for the end pixel of interest. An end pixel connectivity check comprises an analysis of the runs in the top and bottom rows that includes the column in which the end pixel falls. Since the end pixel is a removal candidate, it, by definition, is located to an adjacent "off" run in the top row. If the adjacent "off" run in the top row ends in the column in which the end pixel falls, then the column in the top row following the column of the end pixel would necessarily contain an "on" pixel. Thus the end pixel would be "corner connected" with the top row. As such, the end pixel would be a necessary part of the skeleton of the image. Likewise, if the end pixel is adjacent to an "off" run in the bottom row that ends in the column in which the end pixel falls, then the end pixel would be "corner connected" to the bottom row.

However, if the end pixel is located in the last column of the image, then it cannot be corner connected with either the top or bottom row since there would not be an "on" pixel located in the column following the column of the end pixel. Therefore, in the example of FIG. 4, the end pixel (which is located in column 13) would not only be a candidate for removal (since it is beneath an "off" pixel in the virtual top row) but it would also be removed since it is at the end of the image and cannot be corner connected. Thus, the image stored in the first pass destination buffer following the top-left analysis pass of the top row would be replaced with "0:14".

B. Top-Left Analysis of Row "1"

The top-left analysis pass would continue with an analysis of the next row of the image. In the example of FIG. 4, the next row would be row "1", which comprises an initial run of 1 "off" pixel followed by a middle run of 12 "on" pixels and a final run of 1 "off" pixel. In index table format, row "1" is represented as "1:1,12,1".

It is important to note that each row that is processed during each analysis pass is compared with the image that exists in the source image buffer and not the new, temporary image that is created in the destination buffer as a result of the analysis. Therefore, in the example of FIG. 4, when the process indexes to the analysis of row "1", row "1" is analyzed with respect to the top and bottom rows that are stored in the source buffer and so on with respect to the analyses of subsequent rows.

Returning to the example of FIG. 4, row "1" will now be analyzed to show the special case when a middle group of "on" pixels in the process row is not sandwiched between runs in both the top and bottom rows. In the example, the process row is "1:1,12,1" and is compared to the top and bottom rows of the image stored in the source buffer, which are "0:9,5" and "2:0,5,2,7", respectively.

1. Analysis of First "On" Run

The analysis begins with an analysis of the first run of the process row to determine whether it is an "off" run or an "on" run. In this case, the first is an "off" run consisting of a single "off" pixel. Therefore, this single "off" pixel would be transferred to begin row "1" of the image stored in the first pass destination buffer. Thus, the image stored in the destination buffer would now be:

0:14; and

1:1 a. Analysis of First "On" Pixel in Process Run

Next, the first "on" pixel of the first "on" run of the process row is considered. As explained above, the first "on" pixel of a process run in a top-left analysis pass is always a candidate for removal. Furthermore, it is removed if it is not corner connected to an "on" run in either to top or bottom rows that ends in the column before the column containing the first "on" pixel in the process run and is not an endpoint pixel.

In the example of FIG. 4, the first "on" pixel of the process run is not corner connected. Additionally, the first "on" pixel is not sandwiched between "off" runs in both the top and bottom adjacent rows. Therefore, it is not part of the skeleton and is removed. Accordingly, an "off" pixel is added to the initial "off" run in the image stored in the destination buffer for row "1" thus, row "1" becomes "1:2".

b. Analysis of Middle Group of "On" Pixels in Process Run

Next, the middle group of "on" pixels is analyzed. In the example of FIG. 4, the middle group of pixels are located in columns 2–11 of row "1".

(i) Sandwich Check

The sandwich check indicates that the middle group of "on" pixels is not sandwiched between runs in both the top and bottom rows. In this case the sandwich check fails because the bottom row comprises an initial "on" run ending in column 4, followed by an "off" run comprising 2 "off" pixels in columns 5 and 6, followed by a final run of 7 "on" pixels. Since the middle group of "on" pixels is not sandwiched, the middle group must be broken down into "sub-runs", each of which is sandwiched between runs in the top and bottom rows. Each sub-run must then be analyzed using the same tripartite test used for regular runs, in which the first, middle group and end "on" pixels are considered.

(ii) Sub-Run Analysis of Non-Sandwiched Middle Group

In the example of FIG. 4, the first sub-run of the middle group of "on" pixels would be located in columns 2, 3 and 4. This sub-run is sandwiched between a run of "off" pixels in the top row and a run of "on" pixels in the bottom row that ends at column 4. The sub-run analysis begins with an analysis of the first "on" pixel of the sub-run. Since we are analyzing the first "on" pixel during a top-left analysis pass, the first "on" pixel is always a candidate for removal since it is adjacent to an "off" pixel to its immediate left. However, in order to determine whether the first "on" pixel can in fact be removed, we must perform a corner pixel connectivity analysis. During a sub-run analysis the corner connective analysis only considers the bottom run corner connective condition, i.e., whether there is an "off" run that ends in the column preceding the column containing the first "on" pixel in the sub-run. If there is an "off" run that ends in the column preceding the column containing the first "on" pixel in the sub-run, then the first "on" pixel is corner connected and must remain as part of the skeleton of the image. In any other case, the first "on" pixel is removed.

In the example of FIG. 4, the pixel of interest is the pixel located in row "1" at column 2. In the example there is not an "on" run in the bottom row that ends in column 1. Therefore, the first "on" pixel of the sub-run is not part of the skeleton of the image and can be removed. The "1:2" index table image format stored in the first pass destination buffer for row "1" would be updated by adding "1" to the initial "off" run stored therein. Thus, row "1" of the image stored in the first pass destination buffer would be replaced with "1:3".

The middle group of "on" pixels in the first sub-run comprises a single "on" pixel located in column 3. Since this pixel is sandwiched between an "off" run in the top row (row "0") and an "on" run in the bottom row (row "2"), it is removed. Thus, row "1" of the image stored in the first pass destination buffer would be replaced with "1:4".

Next, the end "on" pixel of the first sub-run is considered. An end pixel of a sub-run is a candidate for removal if the top row contains an "off" pixel in the same column as the end pixel of the sub-run and the bottom row contains an "on" pixel. In the example of FIG. 4, there is an "off" pixel in row "0", column 4 and an "on" pixel in row "2", column 4. Therefore the end "on" pixel of the first sub-run is a removal candidate.

Once an end "on" pixel is declared a removal candidate, the process analyzes the bottom "on" run to determine if it ends at the same column as the end "on" pixel in the sub-run being analyzed. If the bottom "on" run ends at the same column as the end "on" pixel of the sub-run, then the end "on" pixel is part of the skeleton and cannot be removed. On the other hand if the bottom "on" run does not end at the same column as the end "on" pixel of the sub-run, then the end "on" pixel is not part of the skeleton and is removed. In the example of FIG. 4, the "on" run in the bottom row containing the end "on" pixel of the process row ends at the same column as the end "on" pixel of the sub-run. Therefore, the end "on" pixel of this sub-run remains and the process adds an "on" run comprising a single pixel to the image stored in the destination buffer after the initial "off" run already stored therein, thus creating a new image for row "1" in the destination buffer of "1:4,1".

The next sub-run is then considered. In the example this is a sub-run comprising "on" pixels in columns 5 and 6. The pixels of this sub-run are not candidates for removal since they are not sandwiched between a top adjacent run of "off" pixels and a bottom adjacent of "on" pixels. Therefore, they remain as part of the skeleton and the image stored in the destination buffer is updated to become "1:4,3".

The next sub-run is then considered, which in the example is the run comprising "on" pixels in columns 7 and 8. The pixels in this sub-run are candidates for removal since they are sandwiched between a run of "off" pixels in the bottom row and a run of "on" pixels in the top row. Therefore, the first "on" pixel of the sub-run must be considered to determine if it is "corner connected".

In the example of FIG. 4, the bottom row comprises an "off" run that ends in the column preceding the column of the first "on" pixel of the sub-run being analyzed. Therefore, the first "on" pixel of the sub-run is corner connected and must remain as part of the skeleton of the image. The image stored in the destination buffer must therefore be updated by adding an "on" pixel to the "on" run in the destination image. Thus, row "1" of the destination image would now comprise "1:4,4".

Since the sub-run being analyzed contains only two "on" pixels it does not have a middle group of pixels. Therefore, the next pixel analyzed is the pixel that is located in column 8, which is analyzed as an end pixel. As explained above, an end pixel is a removal candidate if it is sandwiched between an "off" run in the top row and an "on" run in the bottom row, which is the case for the end pixel being considered in this sub-run. Since the end pixel in this sub-run is a removal candidate, a corner connectivity check must be performed in order to determine whether it can be removed. In this case, since the "on" run in the bottom row that contains the end pixel in the process sub-run does not end at the same column as the end pixel in the sub-run, then the end pixel is removed and an "off" run is added to the end of the row "1" image stored in the destination buffer. Thus, the destination image is updated to include a row "1" comprising "1:4,4,1". If a sub-run is only one pixel long, then the single pixel is analyzed as both a first pixel and an end pixel to determine if it is part of the skeleton of the image.

Likewise, the next sub-run of "on" pixels is considered, which comprises the pixels falling in columns 9, 10 and 11. (Note that the pixel in column 12 is not a part of this sub-run since it will be analyzed as the end pixel of the entire middle group of pixels.) The first step is again an analysis to determine if the pixels of the sub-run are removal candidates. In the example, since the sub-run is not sandwiched between an "off" run in the top row and an "on" run in the bottom row, the pixels making up the sub-run are not candidates for removal and must remain as a part of the destination image stored in the destination buffer. Thus, row "1" of the destination image is updated to become "1:4,4, 1,3". The sub-run analysis is now complete.

c. End Pixel Analysis of Process Run

Since the remaining "on" pixel in the process run is (i.e., the "on" pixel located in column 12) an end "on" pixel, it is first analyzed to determine whether it is a candidate for removal. If the end "on" pixel is located below an "off" run in the top row, then it is a candidate for removal. This is not the case for the end "on" pixel being analyzed in row "1" of FIG. 4. Therefore, the end "on" pixel is not removed and an "on" pixel is added to the last "on" run in the destination image. Thus, row "1" of the destination image is updated to become "1:4,4,1,4". Finally, since the process row ends with a run of "off" pixels, the "off" run is simply added as a final "off" run to the row of interest in the destination image. Therefore, row "1" of the destination image becomes "1:4, 4,1,4,1".

C. Top-Left Analysis of Row "2"

The top-left analysis pass is then performed with respect to row "2" of the image, which requires a comparison between the run lengths in row "2" and the run lengths appearing in the top row, which is row "1" of the source image, and a virtual bottom row comprising, a single run of all "off" pixels.

1. Analysis of First "On" Run

The new process row begins with a run comprising 5 "on" pixels. Since the first "on" pixel is located in the first column of the image, there are no "on" runs in either the top or bottom rows that end in the "immediately preceding column." Thus, the first "on" pixel fails the corner connectivity test. Furthermore, since the first "on" pixel is not sandwiched between "off" runs in both the top and bottom rows that end in the column containing the first "on" pixel (in this case only the "off" run appearing in row "1" ends in column "0"), the first "on" pixel is not part of the skeleton of the image. Therefore it is removed and the destination image for row "2" would begin with an initial run of one "off" pixel, which, in index table format, is "2:1".

Next, the middle group of "on" pixels in the first "on" run is considered. This group, which comprises the "on" pixels in columns 1, 2 and 3 are contained by an "on" run in the top row and an "off" run in the bottom row. Therefore, they are not candidates for removal and remain as part of the skeleton of the image. Thus, the destination image for row "2" is updated by adding a run of 3 "on" pixels after the initial run of 1 "off" pixel. In index table format, the new destination image for row "2" becomes "2:1,3".

Finally, the end "on" pixel in the first "on" run of row "2" is analyzed. Since the end "on" pixel is located between an "on" run in the top row and an "off" run in the bottom row, it is not a candidate for removal and thus remains as part of the skeleton. Therefore, the new destination image for row "2" becomes "2:1,4".

Finally, the last run of 2 "off" pixels is added to the destination image as an "off" run following the previous "on" run. Therefore, the destination image for row "2" becomes "2:1,4,2".

2. Analysis of Next "On" Run

The next run of "on" pixels is now considered. The first "on" pixel of this next process run fails its corner connectivity test, since it is not located intermediate an "on" run in either the top or bottom row that ends in the column preceding the column containing the first "on" pixel of the process run. Additionally, since the first "on" pixel is not located between "off" runs in both the top and bottom rows that end in the same column as the first "on" pixel of this next process run, it is not part of the skeleton and is removed. Accordingly, an "off" since pixel is added to the preceding "off" run of the destination image, which yields a new destination image for row "2" of "2:1,4,3".

Next, the middle group of "on" pixels is considered. In this case, it is sandwiched between an "on" run in the top row and an "off" run in the bottom row. Therefore, the pixels in the middle group cannot be removed and row "2" of the destination image is updated to become "2:1,4,3,5".

Finally, the end "on" pixel of the process run is considered. In the example of FIG. 4, the end pixel is located below an "off" run in the top row so it is a candidate for removal and, since it is at the right-most edge of the image it cannot be corner corrected. Therefore, it must be removed. Thus, the destination image for row "2" following the top-left analysis pass becomes "2:1,4,3,5".

Since the example of FIG. 4 comprises an image having only three rows, the top-left analysis pass is now complete and the destination image for the three rows are:

0: 14;
1: 4,4,1,4,1; and
2: 1,4,3,5,1, which are shown in image format in FIG. 5. The destination image from the top-left analysis pass now becomes the source image for the second bottom-right analysis pass. As indicated earlier, the bottom-right analysis pass is tailored to remove all the "on" pixels that are adjacent to "off" pixels on the bottom and right.

II. Bottom-Right Analysis Pass

The bottom-right analysis pass is similar to the top left analysis pass with the following exceptions. First, "on" pixels are not automatically candidates for removal. They are only removal candidates if they are sandwiched between a top "off" run and a bottom "on" run. (The corner connectivity check for first "on" pixels in the bottom-right analysis pass is identical to the top-left analysis pass corner connectivity check.) Additionally, sandwiched middle "on" pixels are only removed if they are sandwiched between bottom "off" and top "on" runs. Finally, during the second pass analysis an end "on" pixel is always a candidate for removal since it is, by definition, adjacent to an "off" pixel to its immediate right. Nonetheless, an end "on" pixel is only removed if it is not "corner connected" and is not an "endpoint" pixel. The corner connectivity check for an end "on" pixel in a bottom-right analysis pass looks to the top and bottom rows to see if there is an "off" run in either row that ends in the same column as the end "on" pixel in the process run. If there is, then the end "on" pixel is kept as part of the skeleton. Otherwise, it is only kept as part of the skeleton if it is an "endpoint" pixel, which is indicated if it is sandwiched between "off" runs in both the top and bottom rows that do not start in the same column as the end "on" pixel. As with the endpoint check for the top-left analysis pass there is a special case for a process run that is only one pixel long. In this case, the end pixel can only be deleted if it is sandwiched between adjacent "off" runs in the top and bottom rows and the adjacent "off" top is at least two pixels long.

A. Bottom-Right Analysis of Row "0"

Turning now to FIG. 5, the bottom-right analysis pass begins with an analysis of row "0" in comparison to a virtual top row comprising all "off" pixels and a bottom row comprising row "1" of the new source image (1:4,4,1,4,1). Since, in the example of FIG. 5, the row "0" comprises a single run of "off" pixels, it is directly copied to the destination image as "0:14".

B. Bottom-Right Analysis of Row "1"

Next, row "1" is analyzed with respect to rows "0" and "2" as the top and bottom rows, respectively. Since row "1" begins with a run of "off" pixels, the "off" run is copied directly to the destination image, which becomes "1:4".

1. Analysis of First "On" Run a. Analysis of First "On" Pixel

Then, the first "on" run is processed as the process run. The first step of this process is to determine if the first "on" pixel of the process run is a removal candidate. Since the second analysis pass is a "bottom-right" analysis, a first "on" pixel is a candidate for removal only if it is sandwiched between a bottom "off" run and a top "on" run. In the example of FIG. 5, the first "on" pixel of the process run is not a candidate for removal, so it remains and the destination image is updated to become "1:4,1". (Note that if it were a candidate for removal, then connectivity checks identical to the first analysis pass would have to be performed.)

b. Analysis of Middle Group of "On" Pixels

Like the top-left analysis pass, the next step of the bottom-right analysis pass analyzes the middle group of "on" pixels in the process run. The first part of this analysis is a containment check. In the example of FIG. 5, the middle group of "on" pixels in the process run, which comprises the "on" pixels located in columns 5 and 6, is sandwiched between "off" runs in both the top and bottom rows. In the bottom-right analysis pass, a sandwiched middle group of "on" pixels is removed only if it is sandwiched between a top "on" run and a bottom "off" run. Since this is not the case in the example, the middle group of "on" pixels is not removed and is added to the preceding "on" run stored in row "1" of the destination image. Thus, row "1" of the destination image now becomes "1:4,3".

c. Analysis of End "On" Pixel

The end "on" pixel of the process run is now considered. During the bottom-right analysis pass, an end "on" pixel is automatically a candidate for removal since it is, by definition, adjacent to a right "off" pixel. However, an end "on" pixel is only removed if it is not "corner connected" and is not an "endpoint" pixel.

The corner connectivity check looks at the top and bottom rows to determine if either row includes an "off" run that ends in the same column as the end "on" pixel in the process run. (This indicates that the end "on" pixel is corner connected to an "on" pixel in either the top or bottom row, which is located in the column to the right of the column containing the end "on" pixel of the process run.) If there is, then the end "on" pixel is part of the skeleton and cannot be removed. Otherwise, the end "on" pixel is eliminated unless it is an "endpoint" pixel. In the example of FIG. 5, there is an "off" run in the bottom row that ends in column 7, which is the column in which the end "on" pixel resides. Therefore, the end "on" pixel is corner connected and is part of the skeleton and cannot be removed. Thus, row "1" of the image stored in the destination buffer becomes "1:4,4".

Since the succeeding run is an "off" run, it is copied directly to the destination buffer, where row "1" of the image becomes "1:4,4,1".

2. Analysis of Next "On" Run

The next "on" run becomes the new process run and is analyzed as above. In short, since the first pixel is not a candidate for removal it is kept. Likewise, since the middle group of pixels in the new process run are sandwiched between a bottom "on" run and a top "off" run, they cannot be removed. Next, the end "on" pixel connectivity check fails.

Finally, the "endpoint" check fails since the end "on" pixel is not sandwiched between "off" runs in both the top and bottom rows that do not start in the same column as the end "on" pixel. Therefore, the end pixel is not a part of the skeleton and is therefore removed.

Thus, after the second "on" run is processed, row "1" of the destination image becomes "1:4,4,1,5". Finally, since the last run in the process row is an "off" run it is copied directly to row "1" of the destination image, which becomes "1:4, 4,1,3,2".

C. Bottom-Right Analysis of Row

Next, row "2" is processed by comparing it to row "1" and a virtual bottom row containing a single "off" run. The bottom-right analysis pass for row "2" yields a destination image for row "2" of "2:1,3,4,1,5". This final destination image resulting from the bottom-right analysis pass is shown in FIG. 6.

III. Comparison of Destination Image With Source Image

The next step in the process is a comparison of the destination image, which comprises:

0: 14

1: 4,4,1,3,2

2: 1,3,4,1,5 with the source image, which comprises:

0: 14

1: 4,4,1,4,1

2: 1,4,3,5,1

Since the destination image is different from the source image, the image has not been resolved to its skeleton. Therefore, the destination image becomes the new source image and the process is repeated.

IV. Repeat Top-Left and Bottom Right Analysis Passes

A. Top-Left Analysis Pass

Repeating the top-left analysis, using the new source image yields a destination image identical to the new source image, which can be represented as

0:14

1:4,4,1,3,2

2:1,3,4,1,5.

Figure 7:
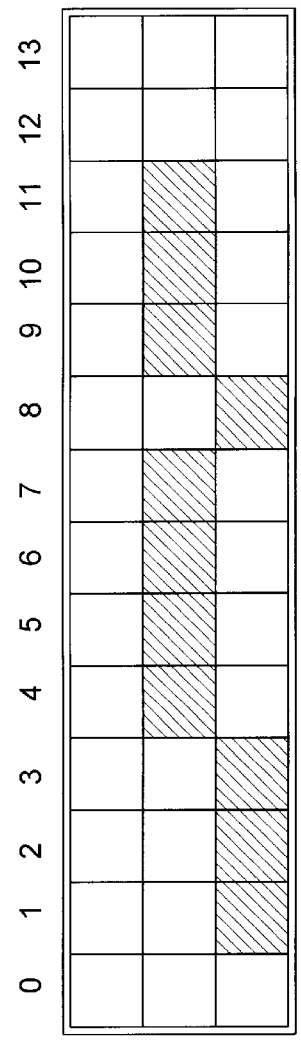
FIG. 7 illustrates a further skeletonization of the original image after a subsequent top-left analysis pass is performed.

This image is shown in image format in FIG. 7.

B. Bottom-Right Analysis Pass

The bottom-right pass analysis is then performed using the destination image as the second pass source image which results in the following destination image:

0:14

1:4,4,1,3,2

2:1,3,4,1,5.

Figure 8:
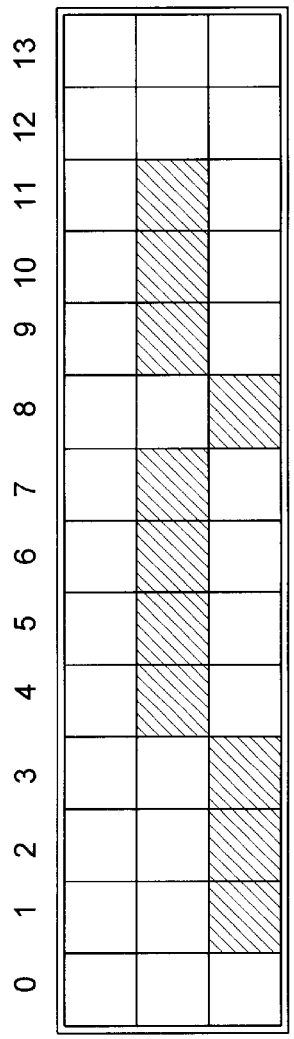
FIG. 8 illustrates the final skeleton of the original image.

This image is shown in FIG. 8. Since the destination/source image comparison indicates that the destination image is identical to the source image, the image has been resolved into its skeleton and the skeletonization process is complete.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any computer program, application or operating system performing skeletonization could benefit from the present invention.

In another example, the order of accomplishing the analysis passes or processing the image in terms of columns of "vertical" run lengths, which are compared to adjacent columns, could be modified without departing from the spirit and scope of the invention.

Those skilled in the art will recognize that additional applications and functions may also be implemented using the steps of the present invention. In addition, the present invention can be integrated closely with many different image processing applications.

In summary, the present invention discloses a method, apparatus, and article of manufacture for reducing an image to its skeleton utilizes a two pass analysis process wherein each row of an image is analyzed with respect to adjacent rows. More specifically, the present invention stores an image in a temporary buffer, reads the image from the temporary buffer and stores the image as a source image in a source image buffer as a series of rows, wherein each row comprises one or more runs of on or off pixels, processes the source image row by row with respect to adjacent top and bottom rows using a two pass analysis process comprised of a top-left analysis pass and a bottom-right analysis pass, wherein the top-left analysis pass analyzes each run in each row of the source image and removes all on pixels adjacent to top and left of runs and wherein the bottom right analysis pass analyzes each run in each row of the source image and removes all on pixels adjacent to bottom and right of runs, builds, after each run is processed in each analysis pass, a destination image in a destination buffer by storing non-removed pixels in the destination image, compares, after each two pass analysis process, the destination image with the source image, replaces the source image with the destination image if the images differ, and repeats the two pass analysis process until the destination image is identical to the source image.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed:

1. A computer-implemented method of reducing an image to its skeleton, comprising the steps of:
   (a) processing, in the computer, a source image using a two pass analysis process comprising a top-left analysis pass and a bottom-right analysis pass, wherein the source image is comprised of a series of rows, each row comprising one or more on or off runs, the on runs comprising at least one on pixel and the off runs comprising at least one off pixel located in contiguous columns, a process row is compared to adjacent top and bottom rows, the top-left analysis pass analyzes each run in each row of the source image and removes all on pixels adjacent to top and left off runs, and the bottom-right analysis pass analyzes each run in each row of the source image and removes all on pixels adjacent to bottom and right off runs; and
   (b) building, in the computer, after each run is processed in each analysis pass, a destination image in a destination buffer by storing non-removed pixels in the destination image.

2. The computer-implemented method of reducing an image to its skeleton of claim 1, further comprising the steps of:
   (c) comparing, after each two pass analysis process, the destination image with the source image;
   (d) replacing the source image with the destination image if the images differ; and
   (e) repeating steps (a)–(d) until the destination image is identical to the source image.

3. The computer-implemented method of reducing an image to its skeleton of claim 1, wherein the top-left analysis comprises the steps of:
   (1) copying off runs in each process row in the destination image;
   (2) analyzing each on run in the process row using a tripartite analysis, wherein the analysis considers the on run in terms of a first pixel, a middle group of pixels and an end pixel;
   (3) performing a first pixel analysis which comprises removing the first on pixel and storing an off pixel in the destination image unless the first pixel is corner connected or an endpoint pixel;
   (4) reducing a non-sandwiched middle group of pixels into sandwiched sub-runs having first, middle and end pixels, and processing each sandwiched sub-run by,
      (i) performing the first pixel analysis for the first pixel,
      (ii) removing middle pixels if they are sandwiched between a top off run and a bottom on run, and
      (iii) performing an end pixel analysis which comprises removing the end pixel if it is adjacent to an off pixel in the top row in the column containing the end pixel and if the end pixel is not corner connected;
   (5) removing a sandwiched middle group of pixels if they are sandwiched between a top off run and a bottom on run;
   (6) performing the end pixel analysis on the end pixel of the run; and
   (7) repeating steps (2) through (6) until all on runs in all rows have been processed.

4. The computer-implemented method of reducing an image to its skeleton of claim 3, wherein the top-left analysis further comprises the step of creating a virtual row comprised of a single off run if the process row is the first row of the source image, the virtual row being used as the top row for the top-left analysis.

5. The computer-implemented method of reducing an image to its skeleton of claim 3, wherein the top-left analysis further comprises the step of defining a virtual row comprised of a single off run if the process row is the last row of the source image, the virtual row being used as the bottom row for the top-left analysis.

6. The computer-implemented method of reducing an image to its skeleton of claim 3, wherein the first pixel is corner connected if there exists an on run in the top or bottom row that ends in the column preceding the column containing the first on pixel.

7. The computer-implemented method of reducing an image to its skeleton of claim 3, wherein a first on pixel is an endpoint pixel if it is sandwiched off runs in both the top row and bottom that do not end in the same column as the first on pixel.

8. The computer-implemented method of reducing an image to its skeleton of claim 1, wherein the bottom-right analysis pass comprises the steps of:
   (1) copying off runs in each process row into the destination buffer;
   (2) analyzing each on run in the process row using a tripartite analysis, wherein the analysis considers the on run in terms of a first pixel, a middle group of pixels and an end pixel;
   (3) performing a first pixel analysis which comprises removing the first on pixel and storing an off pixel in the destination buffer if the first pixel is sandwiched between a top off run and a bottom on run and the first on pixel is not corner connected;
   (4) reducing a non-sandwiched group of middle pixels into sandwiched sub-runs having first, middle, and end pixels and processing each sandwiched sub-run by,
      (i) performing the first pixel analysis for the first pixel,
      (ii) removing middle pixels if they are sandwiched between a top on run and a bottom off run, and
      (iii) performing an end pixel analysis which comprises removing the end pixel unless it is corner connected or it is an endpoint pixel;
   (5) removing a sandwiched middle group of pixels if they are sandwiched between a top on run and a bottom off run;
   (6) performing the end pixel analysis on the end pixel of the run; and
   (7) repeating steps (1) through (6) until all runs in all rows have been processed.

9. The computer-implemented method of reducing an image to its skeleton of claim 8, wherein the bottom-right analysis further comprises the step of creating a virtual row comprised of a single off run if the process row is the first row of the source image, the virtual row being used as the top row for bottom-right analysis.

10. The computer-implemented method of reducing an image to its skeleton of claim 8, wherein the bottom-right analysis further comprises the step of defining a virtual row comprised of a single off run if the process row is the last row of the source image, the virtual row being used as the bottom row for the bottom-right analysis.

11. The computer-implemented method of reducing an image to its skeleton of claim 8, wherein the first pixel is corner connected if there exists an on run in the top or bottom row that ends in the column preceding the column containing the first on pixel.

12. The computer-implemented method of reducing an image to its skeleton of claim 8, wherein a first on pixel is an endpoint pixel if it is sandwiched off runs in both the top row and bottom that do not end in the same column as the first on pixel.

13. A computer-implemented apparatus for reducing an image to its skeleton, comprising:
   (a) a computer;
   (b) means, performed by the computer, for processing a source image using a two pass analysis process comprising a top-left analysis pass and a bottom-right analysis pass, wherein the source image is comprised of a series of rows, each row comprising one or more on or off runs, the on runs comprising at least one on pixel and the off runs comprising at least one off pixel located in contiguous columns, a process row is compared to adjacent top and bottom rows, the top-left analysis pass analyzes each run in each row of the source image and removes all on pixels adjacent to top and left off runs, and the bottom-right analysis pass analyzes each run in each row of the source image and removes all on pixels adjacent to bottom and right off runs; and
   (c) means, performed by the computer, for building, after each run is processed in each analysis pass, a destination image in a destination buffer by storing non-removed pixels in the destination image.

14. The computer-implemented apparatus of reducing an image to its skeleton of claim 13, further comprising:
   (d) means for comparing, after each two pass analysis process, the destination image with the source image;
   (e) means for replacing the source image with the destination image if the images differ; and
   (f) means for repeating the means (b)–(e) until the destination image is identical to the source image.

15. The computer-implemented apparatus of reducing an image to its skeleton of claim 13, wherein the top-left analysis comprises:
   (1) means for copying off runs in each process row in the destination image;
   (2) means for analyzing each on run in the process row using a tripartite analysis, wherein the analysis considers the on run in terms of a first pixel, a middle group of pixels and an end pixel;
   (3) means for performing a first pixel analysis which comprises removing the first on pixel and storing an off pixel in the destination image unless the first pixel is corner connected or an endpoint pixel;
   (4) means for reducing a non-sandwiched middle group of pixels into sandwiched sub-runs having first, middle and end pixels, and processing each sandwiched sub-run by,
      (i) performing the first pixel analysis for the first pixel,
      (ii) removing middle pixels if they are sandwiched between a top off run and a bottom on run, and
      (iii) performing an end pixel analysis which comprises removing the end pixel if it is adjacent to an off pixel in the top row in the column containing the end pixel and if the end pixel is not corner connected;
   (5) means for removing a sandwiched middle group of pixels if they are sandwiched between a top off run and a bottom on run;
   (6) means for performing the end pixel analysis on the end pixel of the run; and
   (7) means for repeating the means (2) through (6) until all on runs in all rows have been processed.

16. The computer-implemented apparatus of reducing an image to its skeleton of claim 15, wherein the top-left analysis further comprises means for creating a virtual row comprised of a single off run if the process row is the first row of the source image, the virtual row being used as the top row for the top-left analysis.

17. The computer-implemented apparatus of reducing an image to its skeleton of claim 15, wherein the top-left analysis further comprises means for defining a virtual row comprised of a single off run if the process row is the last row of the source image, the virtual row being used as the bottom row for the top-left analysis.

18. The computer-implemented apparatus of reducing an image to its skeleton of claim 15, wherein the first pixel is corner connected if there exists an on run in the top or bottom row that ends in the column preceding the column containing the first on pixel.

19. The computer-implemented apparatus of reducing an image to its skeleton of claim 15, wherein a first on pixel is an endpoint pixel if it is sandwiched off runs in both the top row and bottom that do not end in the same column as the first on pixel.

20. The computer-implemented apparatus of reducing an image to its skeleton of claim 13, wherein the bottom-right analysis pass comprises:
   (1) means for copying off runs in each process row into the destination buffer;
   (2) means for analyzing each on run in the process row using a tripartite analysis, wherein the analysis considers the on run in terms of a first pixel, a middle group of pixels and an end pixel;
   (3) means for performing a first pixel analysis which comprises removing the first on pixel and storing an off pixel in the destination buffer if the first pixel is sandwiched between a top off run and a bottom on run and the first on pixel is not corner connected;
   (4) means for reducing a non-sandwiched group of middle pixels into sandwiched sub-runs having first, middle, and end pixels and processing each sandwiched sub-run by,
      (i) performing the first pixel analysis for the first pixel,
      (ii) removing middle pixels if they are sandwiched between a top on run and a bottom off run, and
      (iii) performing an end pixel analysis which comprises removing the end pixel unless it is corner connected or it is an endpoint pixel;
   (5) means for removing a sandwiched middle group of pixels if they are sandwiched between a top on run and a bottom off run;
   (6) means for performing the end pixel analysis on the end pixel of the run; and
   (7) means for repeating the means (1) through (6) until all runs in all rows have been processed.

21. The computer-implemented apparatus of reducing an image to its skeleton of claim 20, wherein the bottom-right analysis further comprises means for creating a virtual row comprised of a single off run if the process row is the first row of the source image, the virtual row being used as the top row for bottom-right analysis.

22. The computer-implemented apparatus of reducing an image to its skeleton of claim 20, wherein the bottom-right analysis further comprises means for defining a virtual row comprised of a single off run if the process row is the last row of the source image, the virtual row being used as the bottom row for the bottom-right analysis.

23. The computer-implemented apparatus of reducing an image to its skeleton of claim 20, wherein the first pixel is corner connected if there exists an on run in the top or bottom row that ends in the column preceding the column containing the first on pixel.

24. The computer-implemented apparatus of reducing an image to its skeleton of claim 20, wherein a first on pixel is an endpoint pixel if it is sandwiched off runs in both the top row and bottom that do not end in the same column as the first on pixel.

25. An article of manufacture comprising a computer program carrier readable by a computer and embodying one or more instructions executable by the computer to perform method steps of reducing an image to its skeleton, the method comprising the steps of:
   (a) processing a source image using a two pass analysis process comprising a top-left analysis pass and a bottom-right analysis pass, wherein the source image is comprised of a series of rows, each row comprising one or more on or off runs, the on runs comprising at least one on pixel and the off runs comprising at least one off pixel located in contiguous columns, a process row is compared to adjacent top and bottom rows, the top-left analysis pass analyzes each run in each row of the source image and removes all on pixels adjacent to top and left off runs, and the bottom-right analysis pass analyzes each run in each row of the source image and removes all on pixels adjacent to bottom and right off runs; and
   (b) building, after each run is processed in each analysis pass, a destination image in a destination buffer by storing non-removed pixels in the destination image.

26. The computer-implemented method of reducing an image to its skeleton of claim 25, further comprising the steps of:
   (c) comparing, after each two pass analysis process, the destination image with the source image;
   (d) replacing the source image with the destination image if the images differ; and
   (e) repeating steps (a)–(d) until the destination image is identical to the source image.

27. The computer-implemented method of reducing an image to its skeleton of claim 25, wherein the top-left analysis comprises the steps of:
   (1) copying off runs in each process row in the destination image;
   (2) analyzing each on run in the process row using a tripartite analysis, wherein the analysis considers the on run in terms of a first pixel, a middle group of pixels and an end pixel;
   (3) performing a first pixel analysis which comprises removing the first on pixel and storing an off pixel in the destination image unless the first pixel is corner connected or an endpoint pixel;
   (4) reducing a non-sandwiched middle group of pixels into sandwiched sub-runs having first, middle and end pixels, and processing each sandwiched sub-run by,
      (i) performing the first pixel analysis for the first pixel,
      (ii) removing middle pixels if they are sandwiched between a top off run and a bottom on run, and
      (iii) performing an end pixel analysis which comprises removing the end pixel if it is adjacent to an off pixel in the top row in the column containing the end pixel and if the end pixel is not corner connected;
   (5) removing a sandwiched middle group of pixels if they are sandwiched between a top off run and a bottom on run;
   (6) performing the end pixel analysis on the end pixel of the run; and
   (7) repeating steps (2) through (6) until all on runs in all rows have been processed.

28. The computer-implemented method of reducing an image to its skeleton of claim 27, wherein the top-left analysis further comprises the step of creating a virtual row comprised of a single off run if the process row is the first row of the source image, the virtual row being used as the top row for the top-left analysis.

29. The computer-implemented method of reducing an image to its skeleton of claim 27, wherein the top-left analysis further comprises the step of defining a virtual row comprised of a single off run if the process row is the last row of the source image, the virtual row being used as the bottom row for the top-left analysis.

30. The computer-implemented method of reducing an image to its skeleton of claim 27, wherein the first pixel is corner connected if there exists an on run in the top or bottom row that ends in the column preceding the column containing the first on pixel.

31. The computer-implemented method of reducing an image to its skeleton of claim 27, wherein a first on pixel is an endpoint pixel if it is sandwiched off runs in both the top row and bottom that do not end in the same column as the first on pixel.

32. The computer-implemented method of reducing an image to its skeleton of claim 25, wherein the bottom-right analysis pass comprises the steps of:
   (1) copying off runs in each process row into the destination buffer;
   (2) analyzing each on run in the process row using a tripartite analysis, wherein the analysis considers the on run in terms of a first pixel, a middle group of pixels and an end pixel;
   (3) performing a first pixel analysis which comprises removing the first on pixel and storing an off pixel in the destination buffer if the first pixel is sandwiched between a top off run and a bottom on run and the first on pixel is not corner connected;
   (4) reducing a non-sandwiched group of middle pixels into sandwiched sub-runs having first, middle, and end pixels and processing each sandwiched sub-run by,
      (i) performing the first pixel analysis for the first pixel,
      (ii) removing middle pixels if they are sandwiched between a top on run and a bottom off run, and
      (iii) performing an end pixel analysis which comprises removing the end pixel unless it is corner connected or it is an endpoint pixel;
   (5) removing a sandwiched middle group of pixels if they are sandwiched between a top on run and a bottom off run;
   (6) performing the end pixel analysis on the end pixel of the run; and
   (7) repeating steps (1) through (6) until all runs in all rows have been processed.

33. The computer-implemented method of reducing an image to its skeleton of claim 32, wherein the bottom-right analysis further comprises the step of creating a virtual row comprised of a single off run if the process row is the first row of the source image, the virtual row being used as the top row for bottom-right analysis.

34. The computer-implemented method of reducing an image to its skeleton of claim 32, wherein the bottom-right analysis further comprises the step of defining a virtual row comprised of a single off run if the process row is the last row of the source image, the virtual row being used as the bottom row for the bottom-right analysis.

35. The computer-implemented method of reducing an image to its skeleton of claim 32, wherein the first pixel is corner connected if there exists an on run in the top or bottom row that ends in the column preceding the column containing the first on pixel.

36. The computer-implemented method of reducing an image to its skeleton of claim 32, wherein a first on pixel is an endpoint pixel if it is sandwiched off runs in both the top row and bottom that do not end in the same column as the first on pixel.

* * * * *